UNITED STATES PATENT OFFICE.

CHARLES WALPUSKI, OF NEW YORK, N. Y., ASSIGNOR TO JOSEPH RECKENDORFER, OF SAME PLACE.

IMPROVEMENT IN THE MANUFACTURE OF COLORED CRAYONS.

Specification forming part of Letters Patent No. 209,528, dated October 29, 1878; application filed May 18, 1878.

*To all whom it may concern:*

Be it known that I, CHARLES WALPUSKI, of the city, county, and State of New York, have invented certain new and useful Improvements in the Manufacture of Colored Leads, of which the following is a specification:

The colored leads which I have invented are designed with particular reference to artists' use and as a substitute for water-colors. They can be used as easily and readily as a lead-pencil, and their marks can be erased with india-rubber so long as water is not applied to them. When, however, the drawing is finished, and water is applied to it by means of a brush or otherwise, it becomes permanently fixed on the paper, to all intents and purposes.

My pencil or lead is not only convenient to use, but can be used with a great saving of time, inasmuch as the various colors can be worked together in the picture without waiting for one to dry before applying another, as is the case in water-color painting. The colors, indeed, can be worked into each other in either a dry or a wet state, and so effectively that the picture will have the appearance of oil-coloring rather than water-coloring.

My improved colored leads are produced as follows: All the ingredients must be handled with the greatest accuracy and care to cleanliness, and each one, by puddling or otherwise, should be thoroughly cleansed of all impurity. The ingredients I make use of are coloring-matter, kaolin, starch, and a gelatinous material or substance, such as extract of either linseed (*semen Linum*,) quince-seed, (*semen Cydoniorum*,) Iceland moss, (*Lichen cetraria*,) Irish moss, (*Chondrus crispus*) or the like. I prefer the extract of *semen Cydoniorum*. The ingredients are mixed intimately, by grinding or otherwise, and the resulting composition is then pressed into proper form, in the manner well known to manufacturers of pencil-leads and crayons, and dried at an even temperature of, say, from 20° to 30° Celsius.

The following formula will give excellent results: Coloring-matter, ten parts, by weight; white clay, (kaolin,) four parts; starch, one part; extract *semen Cydoniorum*, one to four parts, according to the color which is made.

I have stated but one of many formulas that might be given, for the proportion may be widely varied, as will readily be understood by those skilled in the art to which this invention relates.

I can use any animal or vegetable coloring-matter that can be worked with water. The proportion of kaolin will vary with the consistency or adhesive character of the particular color employed.

To make a black-lead, for instance, a good formula would be as follows: Coloring-matter, (black,) ten parts, by weight; kaolin, one part; starch, one part; gelatinous matter, six parts. While for blue, the particles of which do not bind together so well, the following proportions would be preferable: Coloring-matter, (blue,) ten parts, by weight; kaolin, four parts; starch, one part; gelatinous matter, five parts.

The starch and gelatinous extract act as an auxiliary binding medium. They also add materially to the quality of the lead or crayon, and seem to heighten the brilliancy of color, and to provide the composition with that quality which causes the colors to be drawn out and developed as they are worked. Their effect is very noticeable. The gelatinous extract that I use has about the consistency of a mass of jelly.

Oil-colors cannot be worked without waiting for one to dry before another is applied, and it is only in exceptional cases that water-colors can be worked without the same delay and inconvenience; but my colors can be worked in a dry state effectively and with entire ease, and consequently with a great saving of time. This quality is of great advantage in sketching, for instance, where, too, a few pencils of the different colors will take the place of palette, brushes, and the like.

By varying the proportions of gelatine or starch, or both, pencils of varying degrees of hardness can be produced, as will be understood without further explanation. Leads thus made possess characteristics which distinguish them from colored pencils, pencil-leads, crayons, or pastilles heretofore in use. Ordinary colored leads cannot be worked in water or on a moist or wet surface. They, moreover, have a glossy appearance, which my leads are free from. Ordinary crayons or pastilles cannot be worked wet. They have a mealy consistency, and give off in their marks a fine dust or meal, from which my pencils are free. In fine, my pencil is a water-color crayon, which can be used as a pencil is used, and at the same time can be worked on a wet or on a moist surface, as a water-color, with like effect, and even better results.

Having described my invention, what I claim, and desire to secure by Letters Patent, is—

1. A composition for colored leads, consisting of coloring-matter combined with a suitable base, such as kaolin, and with starch and gelatinous matter, substantially as specified.

2. The improvement in the art of making colored leads, consisting in combining coloring-matter, kaolin, starch, and gelatinous material of the character substantially as specified, in about the proportions stated, forming said composition into leads or crayons, and drying the same, as set forth.

3. As a new article of manufacture, a water-color pencil or crayon having the characteristics herein specified.

In testimony whereof I have hereunto signed my name in the presence of two subscribing witnesses.

CHARLES WALPUSKI.

Witnesses:
C. S. BRAISTED,
JOE W. SWAINE.